United States Patent [19]

Jacobson et al.

[11] 4,146,100
[45] Mar. 27, 1979

[54] LEVERLESS SCALE SENSOR

[75] Inventors: Walter E. Jacobson, Meriden; John M. Burke, Groton, both of Conn.

[73] Assignee: Revere Corporation of America, Wallingford, Conn.

[21] Appl. No.: 889,848

[22] Filed: Mar. 24, 1978

[51] Int. Cl.² .............................................. G01G 3/14
[52] U.S. Cl. .................................................. 177/211
[58] Field of Search ...................... 177/211; 73/141 A

[56] References Cited

U.S. PATENT DOCUMENTS

| 3,161,046 | 12/1964 | Farley | 73/141 A |
| 3,805,604 | 4/1974 | Ormond | 177/211 X |
| 3,994,161 | 11/1976 | Trozera | 177/211 X |
| 4,020,686 | 5/1977 | Brendel | 177/211 X |

Primary Examiner—George H. Miller, Jr.
Attorney, Agent, or Firm—Cooper, Dunham, Clark, Griffin & Moran

[57] ABSTRACT

This weighing scale has a platform, a load cell supporting the platform and a base supporting the load cell. The load cell utilizes electrical strain gage elements, which are connected in an electrical circuit controlling an indicator. The scale is constructed to be unaffected by the eccentricity of the load on the platform. The scale is particularly suited for use in retail or other establishments, where loads are placed on the platform casually and rapidly, so that eccentric loading is common. The load cell comprises an integral block of material divided by milled apertures and recesses into two vertical members and three horizontal members connecting the vertical members. The platform is supported on one of the vertical members. The base is connected to the other vertical member. The upper and lower horizontal members carry most of the bending moments due to eccentric loads from one vertical member to the other. The middle horizontal member is constructed so that it carries most of the vertical component of the load. The strain gage elements are on this middle horizonal member and thus measure only the vertical load.

14 Claims, 5 Drawing Figures

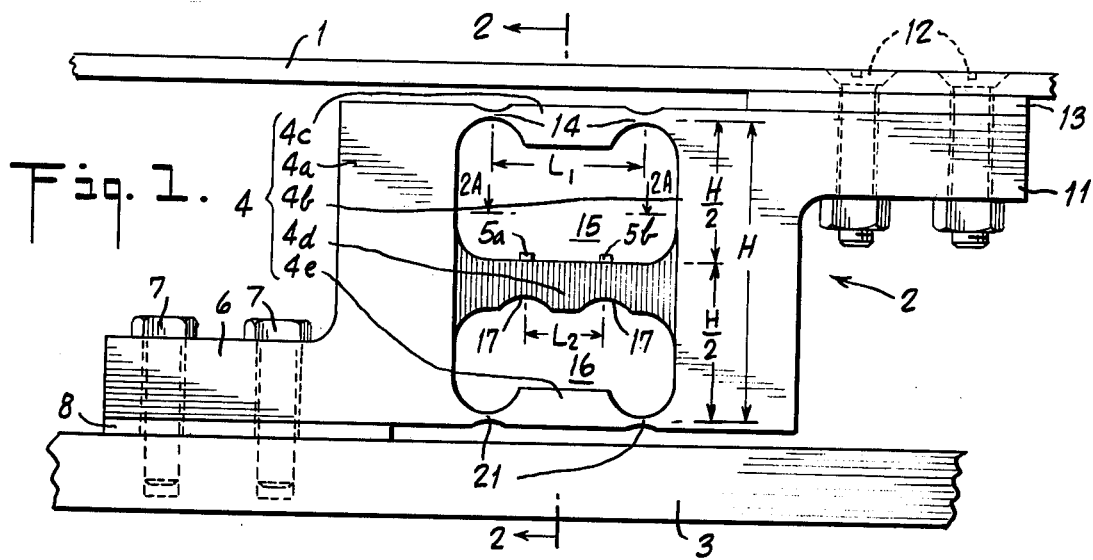
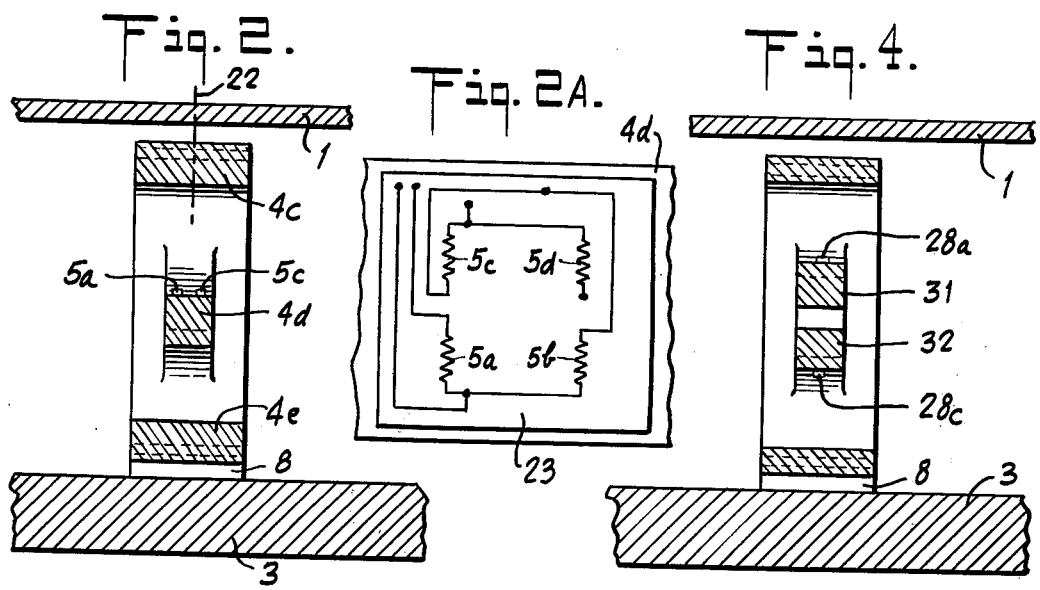
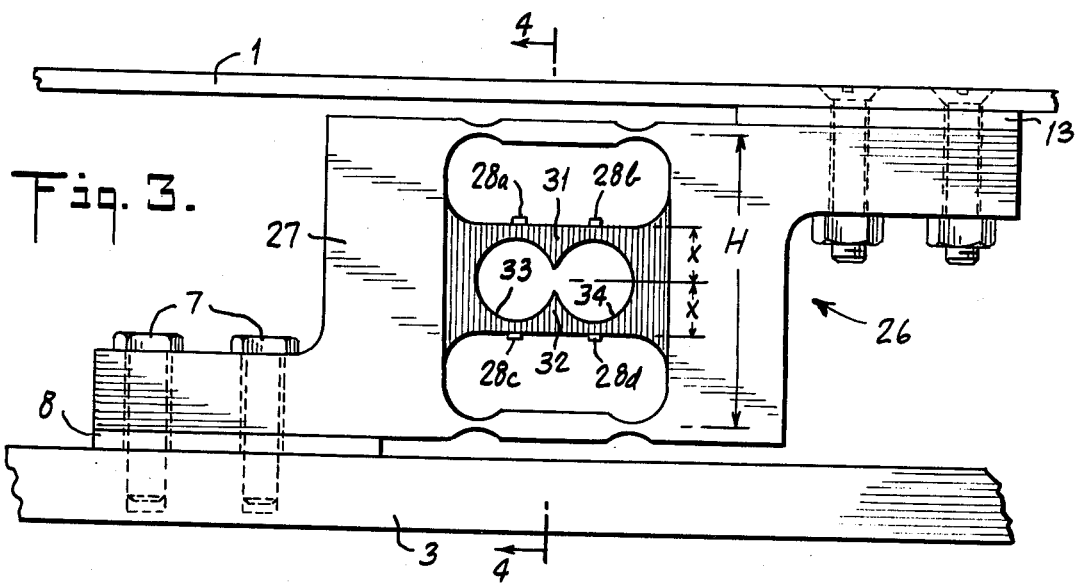

LEVERLESS SCALE SENSOR

CROSS-REFERENCE TO RELATED APPLICATION

This invention is an improvement on the apparatus described and claimed in the copending application of Walter E. Jacobson, Ser. No. 782,714, filed Mar. 30, 1977.

SUMMARY OF THE INVENTION

The invention is particularly concerned with the load cell structure, by which the scale is made insensitive to eccentric loads on the weighing platform. This load cell structure is of general utility in other load cell applications where insensitivity to eccentric loads is desirable.

The load cell comprises an integral block having two apertures milled horizontally and dividing the block into two vertical members and three horizontal members connecting the vertical members.

The upper and lower horizontal members are constructed to transmit most of the bending moments due to eccentric loads from one vertical member to the other. The middle horizontal member transmits most of the compressive loads. The middle member has two regions of minimum cross-section, spaced horizontally by a selected distance. The upper and lower members have two regions of minimum cross-section spaced horizontally by a distance at least about twice the spacing of the two regions on the middle member. The upper and lower members have spring rates of about one-tenth that of the middle member. Thus, the middle member has greater stiffness to vertical loads.

The terms "horizontal" and "vertical", as used herein, accurately reflect the orientation of a load cell used in a weighing scale. When the load cell is used for other purposes, i.e., for measuring forces other than those directed vertically downward, it may be used in other orientations than that shown, and the directions presently called horizontal and vertical will be correspondingly changed.

DRAWINGS

FIG. 1 is an elevational view of a weighing scale embodying the invention, with certain parts broken away.

FIG. 2 is a cross-sectional view taken on the line 2—2 of FIG. 1.

FIG. 2A is a fragmentary view taken on the line 2A—2A of FIG. 2.

FIG. 3 is a view similar to FIG. 1, showing a modification.

FIG. 4 is a view taken on the line 4—4 of FIG. 3.

DETAILED DESCRIPTION

FIGS. 1-2

These figures illustrate a scale including a platform 1 supported on a load cell generally indicated at 2 which is in turn supported on a fixed base 3. The load cell 2 comprises an integral block 4 of elastic material, usually metal, and four strain gage electrical resistance elements 5a, 5b, 5c and 5d.

The block 4 comprises two horizontally spaced, vertically extending members 4a and 4b and three vertically spaced, horizontally extending members 4c, 4d and 4e. The vertically extending member 4a is provided with an integral laterally projecting wing 6 extending outward from its lower end. The wing 6 is fastened to the base by means of screws 7. A shim 8 separates the bottom of the wing 6 from the base 3.

The vertically extending member 4b is provided with a similar integral wing 11 at its upper end. The wing 11 is attached by screws 12 to the platform 1. A shim 13 is provided between the wing 11 and the platform 1. The upper horizontally extending member 4c has two horizontally spaced regions of reduced cross-section shown at 14, created by recesses of arcuate cross-section in the upper surface of the block 4 and similar aligned recesses of arcuate cross-section in the lower surface of the member 4c. The regions of minimum cross-section 14 are spaced horizontally by a distance $L_1$. The block 4 has two transverse bores 15 and 16 of irregular contour, which separate the horizontally extending member 4d from the upper and lower members 4c and 4e. The upper surface of the middle horizontally extending member 4d is flat, and the four strain gage elements 5a, 5b, 5c and 5d are mounted on that flat surface. The middle member 4d has two horizontally spaced regions 17 of reduced cross-section, defined by two recesses of arcuate cross-section, in its under surface. The regions 17 of minimum cross-section in the middle member 4d are separated horizontally by a distance $L_2$.

The lower member 4e is also provided with two regions of minimum cross-section, shown at 21, which are constructed similarly to those in the upper member 4c and are spaced horizontally by the same distance $L_1$.

The distance $L_1$ is made at least about twice the distance $L_2$ and may be made as much as six times $L_2$.

Making $L_1$ greater than $L_2$ increases the moment of inertia of the outer parallelogram comprising the vertical members 4a and 4b and the horizontal members 4c and 4e. The vertical dimensions of the reduced regions 14 and 21 are made smaller than the vertical dimensions of the reduced regions 17 in the middle member 4d. The spring rate of the upper and lower members 4c and 4e, taken together is about 10% of the spring rate of the middle member 4d. Hence, the middle member 4d carries most of the vertical load which is centrally applied to the platform 1, but the upper and lower members 4c and 4e resist most of the torque due to off-center loads, i.e., loads spaced horizontally from center line 22 of the platform 1.

The cross-sectional areas at 14 and 21 are required to be increased when the dimension $L_1$ is made greater than the dimension $L_2$, but this increase in cross-sectional areas provides substantially greater resistance to off-center loads. The structure illustrated is stiffer and has a higher natural frequency than would be the case if $L_1$ were equal to $L_2$. Such a higher natural frequency results in quicker response of the scale to a rapidly applied load. It also allows the use of a higher limiting frequency in a high pass filter in the output of the circuit containing the resistance elements 5a, 5b, 5c and 5d. The higher the noise frequencies which are cut off, the less low frequency noise is received in the electronic circuits to which the resistance elements are connected.

The flat surface of the middle member 4d makes it easier to apply the strain gage elements 5, and to get a good bond between the gage and the underlying surface. There are four strain gage elements, the elements 5a and 5c being vertically aligned with one reduced section 17 and the elements 5b and 5d being vertically aligned with the other reduced section 17.

It is preferred to form all four elements 5 on a single sheet of plastic material, as shown in FIG. 2A, so so that most of the bridge circuit including those elements is mounted on a single plastic sheet 23. Thus, only a single part, namely sheet 23, has to be carefully located with respect to the reduced sections 17. If the resistance elements are affixed separately, each of the four has to be carefully located. As shown in FIG. 2A, five terminals are brought out from the plastic sheet 23 supporting the elements 5 to facilitate the insertion of calibrating resistance elements in the circuit.

The block 4 may be made from run-of-the-mill bar stock whose dimensions are not carefully controlled. The various holes and recesses in the bar stock may be made by a numerically controlled milling machine. By using recesses 14 in the outer surfaces of the upper and lower members 4a, 4b, it is assured that all of the dimensions which critically determine the performance of the load cell are between surfaces which are established by the operation of the milling machine, and not by any surface of the original bar stock. Thus, the effective height H of the block 4 is between the horizontal center line of the reduced regions 14 and the horizontal center line of the reduced regions 21. The upper flat surface of the member 4d, on which the strain gage elements 5 are mounted is located at a distance H/2 from each of those horizontal center lines. All torques due to off-center loads have minimal effect at the neutral axis of the load cell. Thus, the effects of those off-center loads are negligibly small as they appear in the output of the strain gage circuit.

The thickness of the shim 8 determines the deflection of the vertical member 4b at which the base 3 serves as an overload stop for the bottom end of the member 4b.

The side surfaces of the member 4d are cut away to make that member substantially thinner than the upper and lower members 4c and 4e, as shown in FIG. 2. The thinness of the member 4d makes it less resistive to off-center loads, so that most of those loads are carried by the upper and lower members 4c and 4e.

FIGS. 3–4

These figures illustrate a modification of the invention in which the load cell 2 of FIGS. 1 and 2 is replaced by a load cell 26 comprising a block 27 of resilient material and four strain gage elements 28a, 28b, 28c and 28d. The structure of the load cell 26 is generally the same as that of the load cell 2, except that the middle member 4d on the load cell 2 is replaced by two parallel members 31 and 32. The reduced regions in the members 31 and 32 are defined by two intersecting bores 33, 34, which also may be described as separating the two middle members. The upper member 31 has its upper surface flat and separated from the neutral axis of the load cell by a distance X. The lower surface of the member 32 is also flat and is separated from the neutral axis of the load cell 26 by the same distance X.

The members 31 and 32 carry a greater proportion of the torques due to off-center loads than does the member 4d of FIGS. 1 and 2. Nevertheless, the strains due to those loads have equal and opposite effects on the bridge circuit including the strain gages 28, and thus those effects cancel. The operation of the apparatus in FIGS. 3 and 4 is otherwise generally similar to the operation of the apparatus shown in FIGS. 1 and 2.

In the structure of FIGS. 3 and 4, any thermal stresses resulting from heating of the members 31 and 32, either by the electric current flowing through the gage elements or from other sources, are self-canceling, so that the reading of the scale is not affected by such thermal stresses.

In the structure of FIGS. 1 and 2, the thermal stresses on the gages 5 should also be self-correcting. Under particular operating conditions, where the temperatures at the gage elements 5 are not equal, it is conceivable that a thermal stress may be encountered which is not self-canceling. In that event, the structural arrangement shown in FIGS. 3 and 4 may be used.

Although a preference is expressed above for arranging all four gage elements, 5 on a single sheet of plastic material, separate gage elements may be used, or pairs of gage elements may be arranged on each of two sheets.

Where eccentric loading is referred to herein, the eccentricity is with reference to the geometrical center of the load cell, i.e. the intersection of centerline 2—2 in FIG. 2 with the upper surface of the load cell.

The wings, 11 and 6, allow the load cell to be attached to the platform 1 and the base 3 by means of bolts made to either British or metric dimensions. The bolts are not threaded to the wings, 11 and 6, but pass through with slight clearance. The bolts 12 are threaded only into the nuts under the wing 11. The bolts 7 are threaded only into the base.

The usual dimensional tolerances of milling machines are not close enough to give the performance required within the assigned limits of error. After the gages 5 are mounted, it is necessary to calibrate the load cell by filing or otherwise removing small amounts of material selectively from one or more of the reduced sections, 14, 17, and 21. In removing such material, it is taken away from the least sensitive side of the load cell. If the gage elements are thereafter removed or replaced, another calibration by selective removal of material is required.

Ideally, it would be desirable to have the upper and lower members, 4c and 4e, carry only the torques due to eccentric loads and to have the middle member 4d carry only the vertical loads. Necessarily, this ideal cannot be attained. However, by proper design and calibration of the members, 4c, 4d, and 4e, as described above, the performance can be made to approach that ideal within any assigned limits of error.

We claim:
1. A weighing scale, comprising:
   a. a platform for receiving a load to be weighed;
   b. a load cell, comprising:
      1. a frame including two horizontally spaced, elongated, vertically extending members and three elongated, vertically aligned, horizontally extending members connected at their ends to the vertically extending members;
      2. each horizontally extending member having two horizontally spaced regions of reduced cross-section, the horizontal spacing between the center lines of the reduced cross-sectional regions of the upper and lower horizontally extending members being at least twice the horizontal spacing between the center lines of the reduced cross-sectional regions of the middle horizontally extending member;
   c. strain gage resistance elements attached to the reduced cross-sectional regions of the middle one of the three horizontally extending members;
   d. means supporting said platform on the upper end of only one of the vertically extending members; and e. means supporting the lower end of only the other vertically extending member on the base; and f. means including said resistance elements for indicating the weight on said platform.

2. A weighing scale as in claim 1, in which said middle member has a flat and horizontal side at the neutral axis of the load cell and the strain gage elements are affixed to said side.

3. A weighing scale as in claim 1, in which said load cell frame is formed from a single integral piece of bar stock of nominal dimensions, and the reduced cross-sectional regions of the upper and lower horizontally extending members are defined by internal bores extending horizontally through said frame and machined horizontal recesses of arcuate cross-section in the outer surfaces of the frame and aligned with said internal bores, so that the vertical thickness of said regions is determined by the machined surfaces of said bores and recesses.

4. A weighing scale as in claim 1, in which the first-mentioned horizontal spacing is no greater than about six times the second-mentioned horizontal spacing.

5. A weighing scale as in claim 1, including:
a. an integral wing projecting outwardly from the upper end of one of said vertically extending members;
b. means mounting said platform on said wing;
c. a second wing projecting outwardly from the lower end of the other vertically extending member; and
d. means mounting said second wing on said base.

6. A weighing scale as in claim 5, including:
a. a shim between said second wing and said base;
b. said base extending beyond said shim and under said first vertical member and serving as an overload stop, when the load on the scale is sufficient to deflect said first vertical member through a distance equal to the vertical dimension of said shim.

7. A load cell, comprising:
a. a frame including two horizontally spaced, elongated, vertically extending members and three elongated, vertically aligned, horizontally extending members connected at their ends to the vertically extending members;
b. each horizontally extending member having two horizontally spaced regions of reduced cross-section, the horizontal spacing between the center lines of the reduced cross-sectional regions of the upper and lower horizontally extending members is at least twice the horizontal spacing between the center lines of the reduced cross-sectional regions of the middle horizontally extending member;
c. strain gage resistance elements attached to the reduced cross-sectional regions of the middle one of the three horizontally extending members;

d. means for applying a force to be measured to the upper end of only one of the vertically extending members;
e. means for applying a reactive force to the lower end of only the other vertically extending member; and
f. means including said resistance elements for measuring said force to be measured.

8. A load cell as in claim 7, in which said frame is formed from a single integral piece of bar stock of nominal dimensions, and the reduced cross-sectional regions in the upper and lower horizontally extending members are defined by internal bores extending horizontally through said frame and machined horizontal recesses of arcuate cross-section in the outer surfaces of the frame and aligned with said internal bores, so that the vertical thickness of said regions is determined by the locations of the machined surfaces of said bores and recesses.

9. A load cell as in claim 7, in which said middle member has a spring rate about ten times the spring rate of the upper and lower members, taken together.

10. A load cell as in claim 7, including:
a. an integral wing projecting from the outside of the upper end of one of said vertically extending members;
b. means connecting one of said force applying means to said wing;
c. a second wing projecting outwardly from the lower end of the other vertically extending member; and
d. means connecting said second wing to said other force applying means.

11. A load cell as in claim 10, in which:
a. each said wing has smooth cylindrical, unthreaded holes extending vertically therethrough; and
b. said connection means includes bolts extending freely through said holes.

12. A load cell as in claim 7, in which:
a. said middle member has a flat horizontal surface;
b. each region of reduced cross-section in the middle member is defined by a part cylindrical recess in the surface opposite to said flat surface; and
c. each strain gage resistance element is mounted on said flat surface opposite the center line of one of said recesses.

13. A load cell as in claim 12, in which said flat surface is equally distant from the horizontal center lines of the reduced cross-section regions in the upper and lower horizontally extending members.

14. A load cell as in claim 12, in which:
a. said middle member has two flat surfaces equally spaced from the neutral axis of the load cell;
b. said middle member has a pair of cylindrical bores extending horizontally through it and cooperating with said flat surfaces to define said reduced cross-sectional regions; and
c. said strain gage elements are mounted on the flat surfaces in vertical alignment with the center lines of the bores.

* * * * *